United States Patent [19]
Alanara

[11] Patent Number: 6,119,002
[45] Date of Patent: Sep. 12, 2000

[54] MOBILE STATION HAVING METHODS AND APPARATUS FOR PERFORMING NEIGHBOR CHANNEL MEASUREMENTS FROM ANALOG CONTROL CHANNEL

[75] Inventor: Seppo M. Alanara, Oulu, Finland

[73] Assignee: Nokia Mobile Phones Limited, Espoo, Finland

[21] Appl. No.: 08/944,816

[22] Filed: Oct. 6, 1997

[51] Int. Cl.[7] .................................. H04Q 7/32; H04Q 7/38
[52] U.S. Cl. ........................... 455/434; 455/435; 455/437
[58] Field of Search ..................... 455/434, 515, 455/437, 343, 38.2, 127, 435

[56] References Cited

U.S. PATENT DOCUMENTS

| | | | |
|---|---|---|---|
| 4,361,896 | 11/1982 | Garner | 375/343 |
| 4,872,204 | 10/1989 | Hammer et al. | 455/54 |
| 5,144,296 | 9/1992 | DeLuca et al. | 340/825.44 |
| 5,175,874 | 12/1992 | Auchter | 455/574 |
| 5,345,448 | 9/1994 | Keskitalo | 370/95.3 |
| 5,410,733 | 4/1995 | Niva et al. | 455/33.2 |
| 5,471,655 | 11/1995 | Kivari | 455/127 |
| 5,483,668 | 1/1996 | Malkamaki et al. | 455/33.2 |
| 5,517,673 | 5/1996 | Fehnel | 455/434 |
| 5,524,009 | 6/1996 | Tuutijarvi et al. | 370/95.3 |
| 5,634,192 | 5/1997 | Meche et al. | 455/437 |
| 5,842,122 | 11/1998 | Schellinger | 455/403 |
| 5,854,981 | 12/1998 | Wallstedt et al. | 455/439 |

FOREIGN PATENT DOCUMENTS

| | | |
|---|---|---|
| 2 086 106 | 5/1982 | United Kingdom . |
| WO 92/19049 | 10/1992 | WIPO . |

*Primary Examiner*—Daniel S. Hunter
*Assistant Examiner*—Alan T. Gantt
*Attorney, Agent, or Firm*—Ohlandt, Greeley, Ruggiero & Perle, L.L.P.

[57] ABSTRACT

This invention relates to the selection of a control channel in a mobile station, wherein a control data transmission is accomplished by a sequence of repeated control words. Having received a control word without error, the mobile station employs all or a portion of the remaining frame time to measure the signal strength of another control channel so as to enable a selection of a strongest control channel or to detect the availability of a digital control channel. In the preferred embodiment of the invention the mobile station receives at least one repeat of a control word from an analog control channel (ACC) and, if the repeat was received without error, tunes the receiver to receive another control channel, either another ACC from a neighboring cell, or a digital control channel (DCCH).

24 Claims, 5 Drawing Sheets

MOBILE STATION HAVING METHODS AND APPARATUS FOR PERFORMING NEIGHBOR CHANNEL MEASUREMENTS FROM ANALOG CONTROL CHANNEL

FIELD OF THE INVENTION

This invention relates generally to radiotelephones and, in particular, to radiotelephones or mobile stations such as those capable of operation with a cellular network.

BACKGROUND OF THE INVENTION

In a radiotelephone system, the calling area is divided into cells, each of the cells having a base station which is in communication with a multiplicity of mobile stations located within the cell. Each of the mobile stations includes a radiotelephone. In each cell, control signals are sent from the base station to the mobile stations to accomplish functions such as an assignment of a frequency band for telephonic communication and initiation of telephonic communication. The control signals are transmitted by analog control channels (ACC) and/or by digital control channels (DCCH). By example, in the case of a dual mode system, such as the one specified by IS-136, the dual mode capable mobile station is able to receive and respond to either an ACC or a DCCH.

An aspect of the design of a radiotelephone system is the size of a cell surrounding a base station, specifically with respect to the range of an ACC and the range of a DCCH transmitted by the base station. Near the outer edge of a cell, it is necessary for the ACC and/or the DCCH to have sufficient signal strength to enable a mobile station to respond to a page (a request to respond to an incoming telephone call). The footprint or cell size of an ACC with equal field strength to the DCCH is larger because the ACC signal tolerates more co-channel interference. This is due primarily to the simpler modulation scheme and larger error margins of the ACC, as compared to the DCCH. As such, a system based on the use of the ACC has an inherently larger working range than a system that uses a DCCH with comparable layout rules.

The use of the DCCH is typically preferred in that, since the capacity of the DCCH is significantly higher than the capacity of the ACC, the network operator can minimize the number of, and costs associated with, the control channels. The DCCH also offers features not found on the ACC, such as a capability to provide Short Message Service (SMS), and the use of the DCCH furthermore tends to extend mobile station battery life.

Consequently, it is advantageous for a mobile station to switch from an ACC to a DCCH when there is adequate signal strength to do so. Also, it is advantageous for a mobile station to switch from a present DCCH, which may have faded to a weakened signal strength, to a stronger DCCH.

A problem arises in that, in presently available mobile stations, a loss of pages or other control signals may occur since the mobile station will stay tuned to the control channel until the signal degrades to the point that it is no longer useable. Furthermore, and at least for the case of IS-136, information is transmitted on the DCCH for identifying a channel number of a DCCH (if any). However, if the signal has degraded the mobile station may be unable to receive this DCCH information. It is also useful for the mobile station to periodically measure the signal strength of the DCCH radio channel, and also other DCCH channels.

U.S. Pat. No. 4,872,204, to Hammer et al., discloses the operation of a radio communication system including a central station and a plurality of individual remote stations. A determination is made as to whether or not a control signal received at a remote station from a central station is indeed intended for that remote station. If not, and for the remainder of the transmission, the remote station operates so as not to receive control signals from the central station to which it is assigned.

Commonly assigned U.S. Pat. No. 5,471,655, to Raimo Kivari, discloses an extended standby mode of operation for a radiotelephone. Kivari's invention provides a method, and apparatus for performing the method, for reducing the power consumption of a radiotelephone. The method includes steps of (a) receiving with a receiver of a radiotelephone at least a Word Synchronization pattern from a frame that is transmitted over a control channel; (b) receiving a first repeat of a control message that follows the Word Synchronization pattern within the frame; and (c) determining if the first repeat was correctly received. If the first repeat was correctly received, the method includes a further step of (d) determining if at least one reception-related criteria is met. If the reception-related criteria is determined to be met, the method includes a further step of (e) selectively removing operating power from one or more portions of the radiotelephone receiver for a predetermined time period during a remainder of the frame.

The at least one reception-related criteria can be a Message Error Rate (MER) that indicates a number of correctly received frames out of a total number of n last received frames. The reception-related criteria may also include a difference value between a minimum Received Signal Strength Indicator (RSSI) value and a maximum RSSI value that are detected during a predetermined interval of time. For this latter case, the at least one reception-related criteria is determined to be met if the MER is below a predetermined first threshold, and if the RSSI difference value is below a predetermined second threshold.

OBJECTS OF THE INVENTION

It is a first object of this invention to provide an improved method for maintaining a mobile station on a control channel.

It is further object of this invention to provide a method to scan for acceptable ACCs and/or DCCHs while a mobile station monitors an ACC for a page message.

SUMMARY OF THE INVENTION

The foregoing and other problems are overcome and the objects of the invention are realized by methods and apparatus in accordance with embodiments of this invention. A method of this invention is disclosed for operating a mobile station in a cellular communications system, and includes the steps of: (a) tuning a receiver of the mobile station to an analog control channel (ACC) that is broadcast by a base station that services a current cell within which the mobile station is operating; (b) receiving at least one repeat of a control word from the ACC; (c) determining if the received repeat of the control word was received without error; and, for the case where the control word was received without error, (d) tuning the mobile station to at least one other control channel and making a received signal strength measurement from the at least one other control channel. The other control channel may be an ACC of a neighboring cell, a digital control channel (DCCH) of the mobile station's current cell, or a DCCH of a neighboring cell.

The ACC is partitioned into frames where each frame includes a plurality of repeats of the control word. The step of tuning includes a step of initiating a timer to have a value that is less than an amount of time remaining in the ACC frame from which the repeat of the control word was received without error.

The method also includes the steps of storing a result of the RSSI measurement in a memory of the mobile station; and an optional step of reporting to the base station an identity of at least those control channels having a strongest RSSI measurement. The step of tuning thus further includes the steps of: testing the timer to determine if the mobile station has sufficient time to tune to and measure the received signal strength of another control channel; and, if not, retuning the receiver of the mobile station to the ACC that is broadcast by the base station that services the current cell within which the mobile station is operating.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
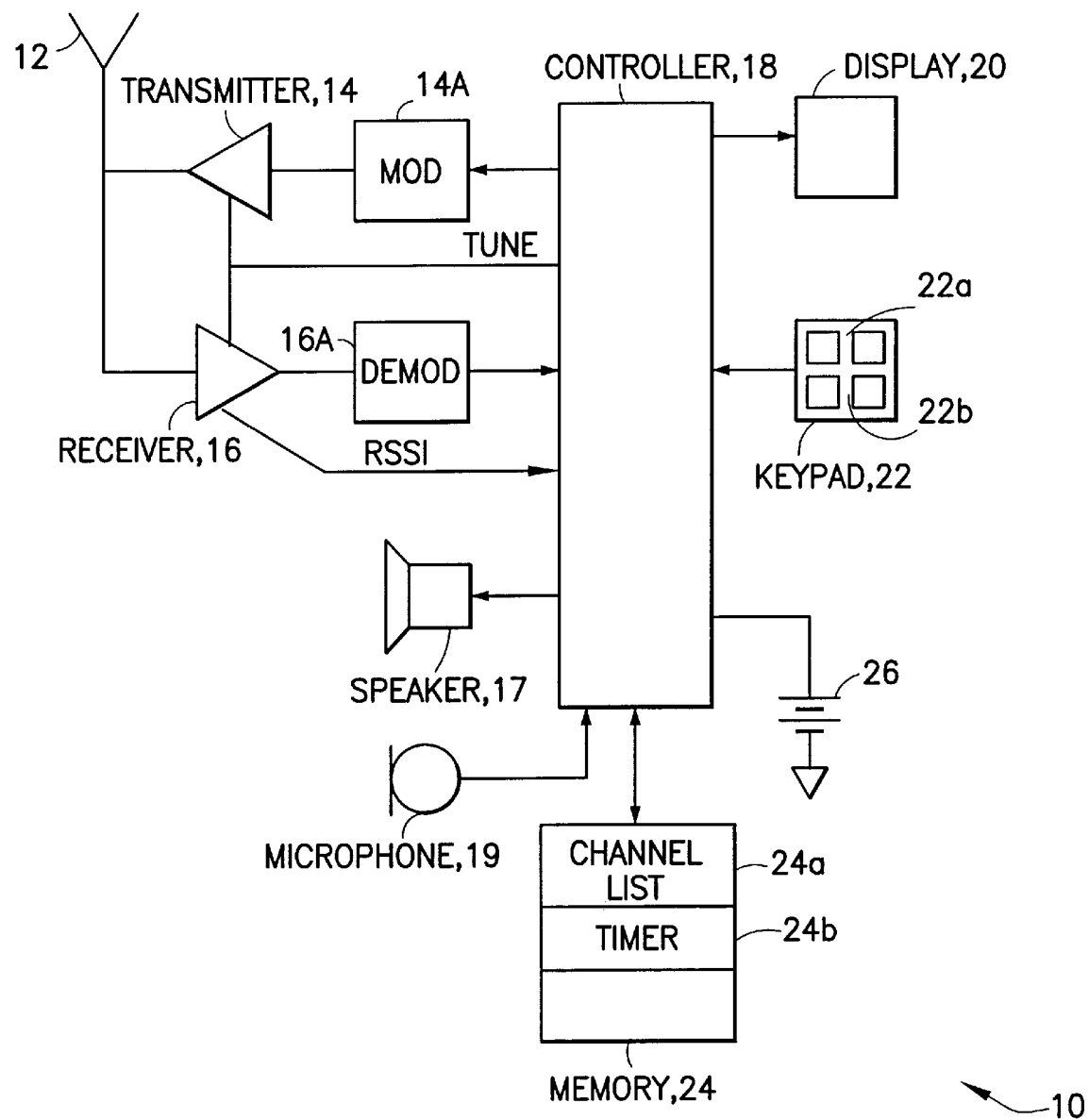
FIG. 1 is a block diagram of a mobile station that is constructed and operated in accordance with this invention.
Figure 2:
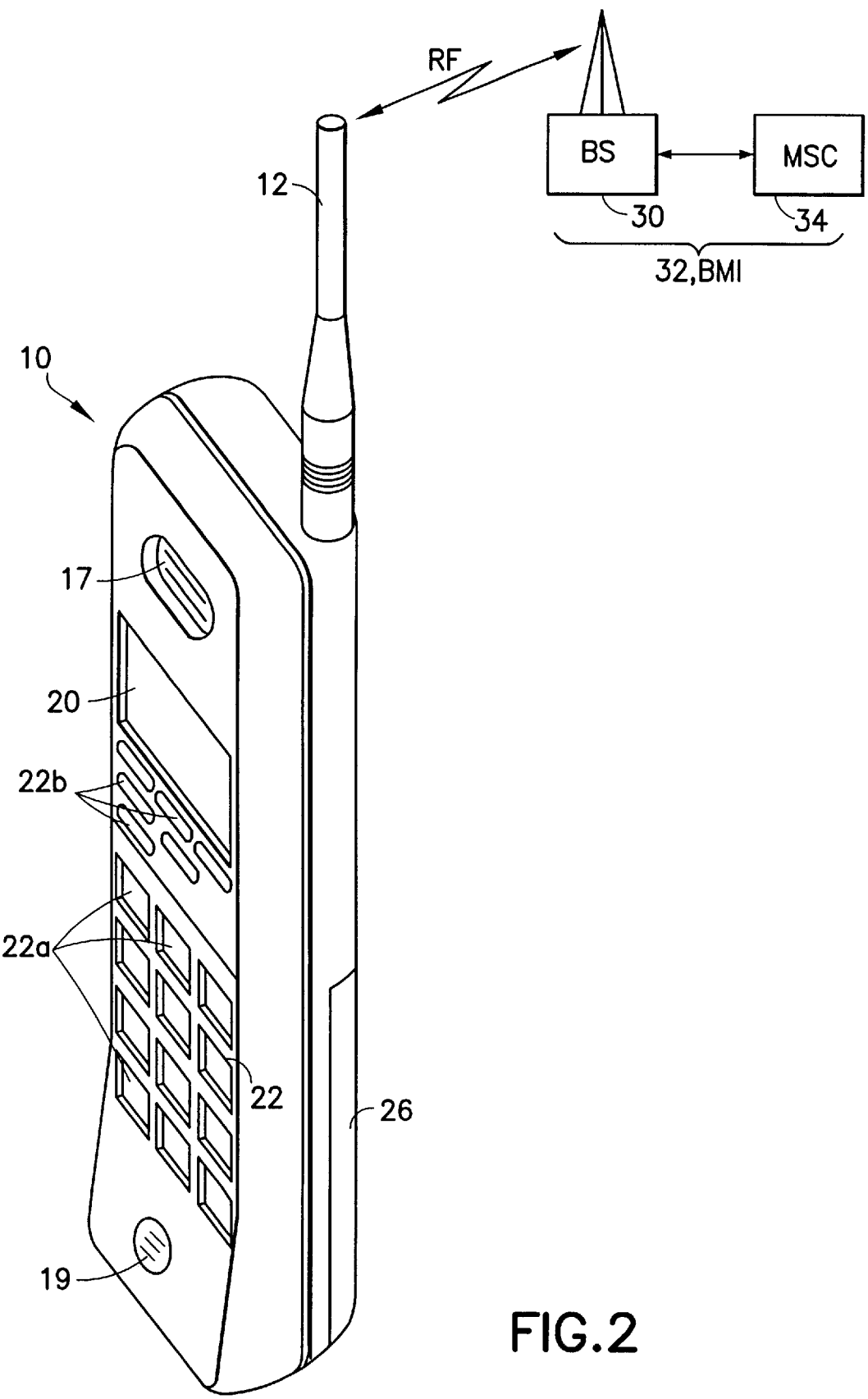
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call. Typically a plurality of the base stations 30 are provided, each serving an associated cell.

The mobile station includes a modulator (MOD) 14A, a tunable transmitter 14 and receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The controller 18 provides a tuning signal (TUNE) to the transmitter 14 and receiver 16 for changing their frequency respective frequency channels in, by example, the analog 800 MHz band and the digital 1900 MHz band. The controller 18 also inputs a received signal strength indicator (RSSI) from the receiver 16, typically from the IF section.

The air interface standard is assumed for this invention to include an ACC and a DCCH of a type that was described above, although the teaching of this invention is not intended to be limited only to this specific embodiment, or for use only with an IS-136 compatible mobile station, or for use only in TDMA type systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The memory 24 also stores the RSSI information that is obtained from the receiver 16.

It should be understood that the mobile station 10 can be a vehicle mounted or a handheld device. It should further be appreciated that the mobile station 10 can be capable of operating with one or more air interface standards, modulation types, and access types.

The operating program in the memory 24 includes routines to present messages and message-related functions to the user on the display 20, typically as various menu items. The memory 24 also includes routines for implementing the method described below in relation to FIGS. 4 and 5.

Figure 3:
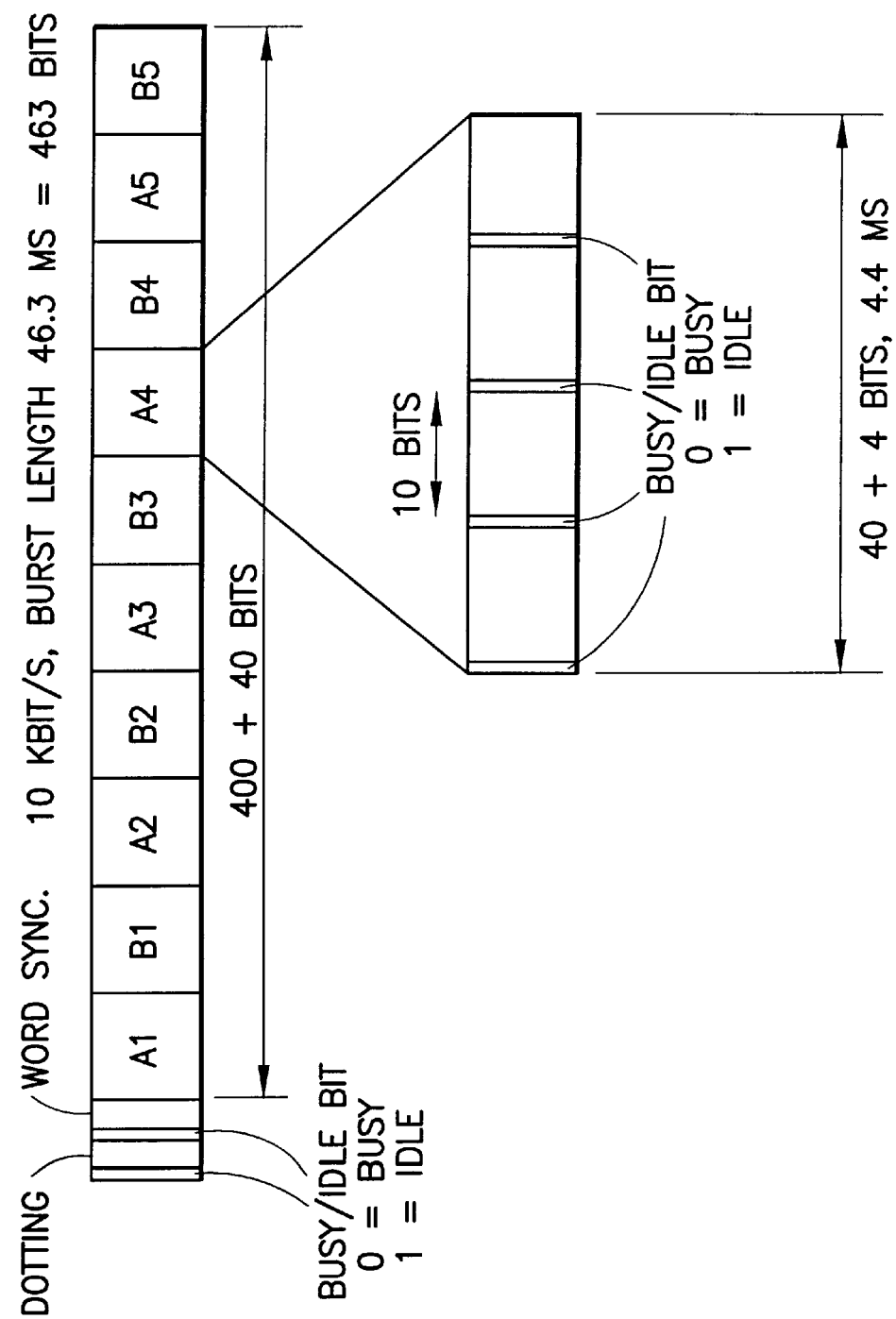
FIG. 3 illustrates the format of an ACC.

FIG. 3 illustrates the message format of the ACC that is broadcast from the base station 30 on a forward control channel. Each message includes dotting and word synchronization portions for synchronizing circuitry of the mobile station 10 with the sequence of repeated words of the forward control channel. One set of repeated words is identified by the legends A1, A2, A3, A4, and A5. A second set of repeated words is identified by the legends B1, B2, B3, B4, and B5. A given mobile station is assigned to receive either the A words or the B words, depending on whether its mobile station identification number is even or odd.

The number of bits provided within the sequence of these words and the amount of time elapsed during a transmission of the message depicted in FIG. 3 are shown directly in the Figure. Similarly, the contents of any one of the words, such as the word A4, is also depicted in FIG. 3 in respect to the number of bits and the elapsed time of the word. Also shown in FIG. 3 is the duration of the maximum time available for a RSSI scanning of adjacent channels which, in accordance with the invention, is provided within the interval of time of the unused repeats. In the example shown in FIG. 3, wherein only the word A1 or B1 need be used for communicating the message of the forward analog control channel, the available time for the RSSI scanning extends from the end of the first A or B word until about the completion of the repeated word B5.

The ACC, in the preferred embodiment of this invention, includes a pointer to a channel number of a DCCH that is also broadcast by the base station 30. The pointer may be pointing to a DCCH broadcast by the same base station 30 which is transmitting the DCCH, but this may not always be the case. More generally, the DCCH can be broadcast by any base station located in the operational area of the mobile station 10. By receiving the ACC and extracting the DCCH channel information the mobile station 10 is able to tune and synchronize to the DCCH.

Figure 4:
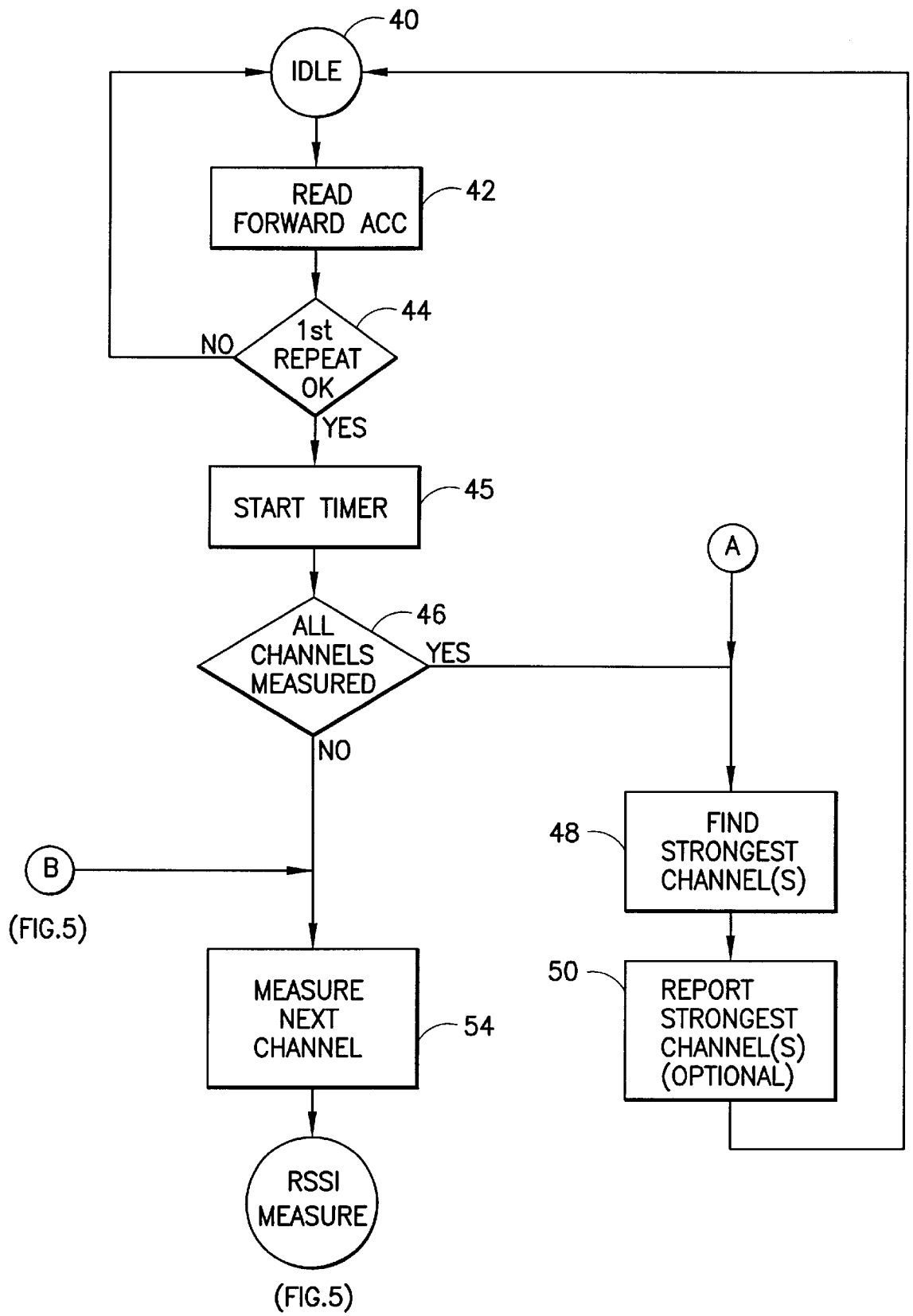
FIGS. 4 and 5 are each a flowchart that depict a method in accordance with this invention.
Figure 5:
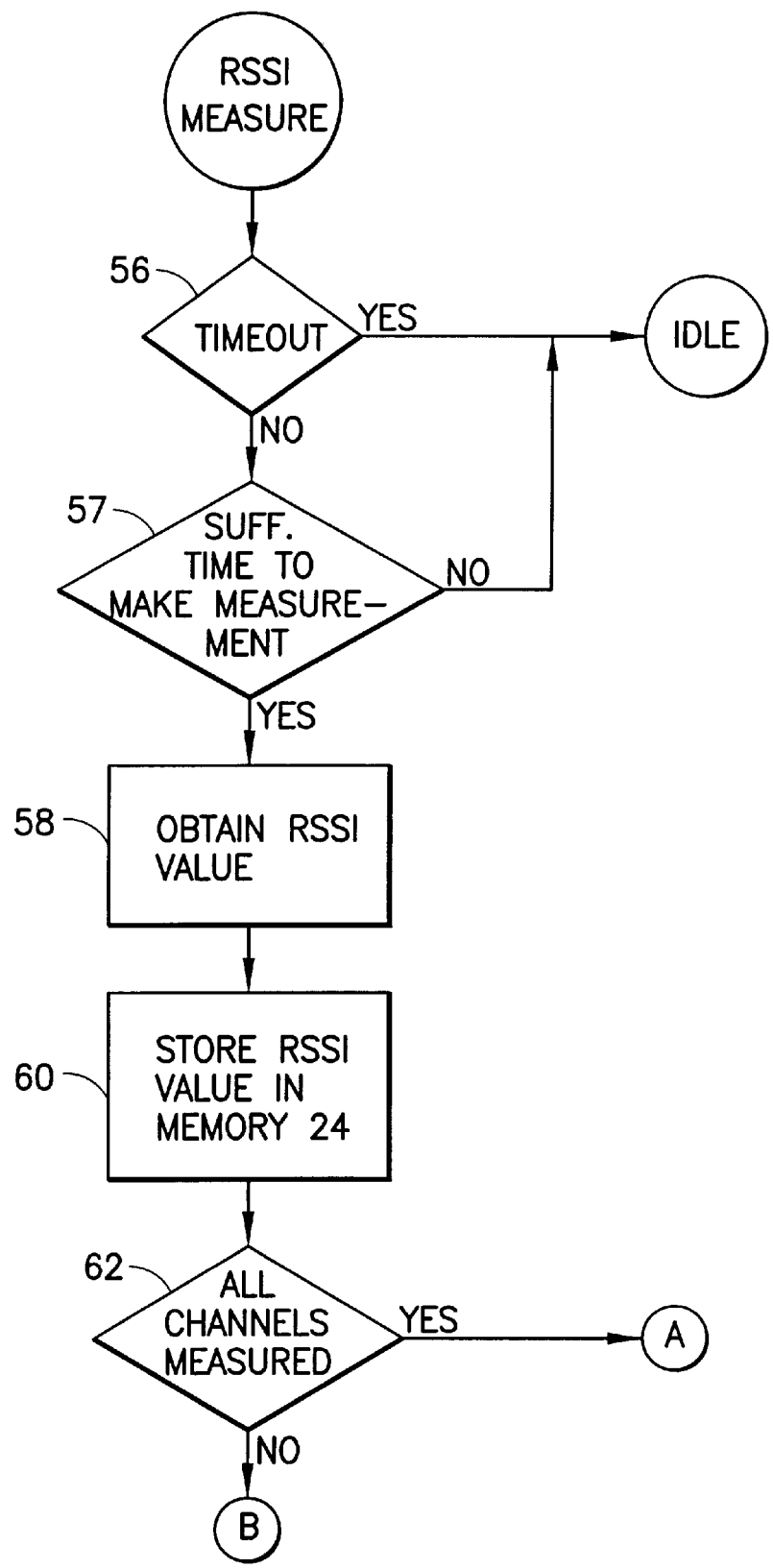

Reference is now made to FIGS. 4 and 5 for illustrating a presently preferred method in accordance with this invention. At Block 40 the mobile station 10 is assumed to be tuned to the analog control channel (ACC) and to be in the idle state. At Block 42 the mobile station 10 reads the dotting and word synchronization fields, synchronizes to the ACC, and reads the first repeat (either A1 or B1). At Block 44 the mobile station 10 determines, using CRC information, if the first repeat was correctly received. If no, the mobile station 10 remains in the idle state to receive the second repeat (either A2 or B2). If the first repeat was correctly received, control passes to Block 45 where the mobile station 10 starts an internal timer 24b (shown as a memory location, although a hardware timer could be used as well). At Block 46 the controller 18 determines if all neighbor channels have been measured. These channels may include the analog control channels of adjacent cells, the DCCH of the serving cell (if present), and also DCCHs of adjacent cells (if present). The channel numbers are stored in the memory 24 as a channel list 24a, which may have been transmitted to the mobile station 10 by the base station 30. The DCCH may have been obtained from the ACC.

If yes at Block 46, control passes to Block 48 where the mobile station 10 examines the memory 24 to determine the strongest channel or channels that have been measured, and at optional Block 50 retunes to the serving ACC and reports the strongest neighbor channel or channels to the base station 30. Control then passes back to the idle state. Assuming that the ACC frame has not ended, the mobile station 10 may enter the low power mode and stay in the low power mode until just prior to the start of the next ACC frame.

If it is determined that not all channels have been measured at Block 46, control then passes to Block 54 where the receiver 16 is tuned to the next channel to be measured. A RSSI measurement routine is then started, as shown in FIG. 5.

Referring to FIG. 5, at Block 56 the mobile station 10 first determines if the timer 24b has expired. If yes, the mobile station 10 retunes to the serving ACC and returns to the idle state in order to receive the next ACC message word. If the timer 24b has not expired, a test is made at Block 57 to determine if sufficient time remains to make another measurement. If no, the mobile station 10 retunes to the serving ACC and returns to the idle state in order to receive the next ACC. If yes at Block 57, control instead passes to Block 58 where the controller 18 obtains the RSSI value from the receiver 16, and then at Block 60 the controller 18 stores the RSSI value in the memory 24. At Block 62 a determination is made if all channels in the channel list 24a have been measured. If yes, control passes to Block 48 of FIG. 4, otherwise control passes to Block 54 to measure the next channel in the channel list 24a.

It can be appreciated that at Block 44, after determining that the second repeat (A2 or B2) was received without error when the first repeat was erroneous, the mobile station 10 transition to execute Block 46. In this case the timer value that is set at Block 45 is reduced by at least 4.4 milliseconds so as to accommodate the additional time that the mobile station 10 remained in the idle state. The same is true if the third repeat is received without error, or the fourth if sufficient time remains to measure at least one adjacent channel or the DCCH. That is, the timer value is reduced to accommodate the lesser amount of time remaining to make channel measurements.

The order of channel measurements can be, by example, all adjacent analog control channels first, followed by the DCCH of the serving cell (or a DCCH of another cell), and then DCCH(s) of adjacent cells. The order of channel measurements may also be, by example, the DCCH of the serving cell (or a DCCH of another cell), followed by all adjacent analog control channels. This latter technique may be preferred since it is advantageous for the mobile station 10 to tune to and camp on a DCCH as soon as possible, as operation in the digital mode is typically preferable over operation in the analog mode. Also, a channel group may be specified, and not just one single channel.

The use of this invention enables neighbor channel measurements to be performed at higher frequency than in conventional AMPS systems, wherein the specified channel rescan operation may occur, by example, only every two to five minutes. Furthermore, by employing the techniques of this invention the mobile station 10 is enabled to continue receiving messages on the ACC, even while scanning for other control channels. This overcomes a problem present in some systems, such as IS-136, wherein during the rescan operation the mobile station is not able to receive mobile terminated messages from the ACC. The use of this invention also enables the mobile station 10 to locate the DCCH and include same in the list of measured neighbor channels, even though the signal strength may be insufficient to allow the mobile station to camp on the DCCH.

Although described in the context of preferred embodiments, it should be realized that a number of modifications to these teachings may occur to one skilled in the art. By example, while described in the context of a dual mode (e.g., analog/digital) mobile station such as an IS-136 compatible mobile station having a lower frequency band of about 800 MHz, with an ACC and a DCCH, and a higher frequency band of about 1900 MHz, having a DCCH, the teachings of this invention apply as well to single mode, analog-only mobile stations, as well as to dual mode mobile stations operating in analog-only networks.

Furthermore, when operating on the ACC the mobile station 10 is currently specified to periodically rescan, such as after each access and if it loses service on the current ACC. The rescan procedure implies that mobile station 10 will stop to receive the ACC broadcast and make measurements of primary and secondary sets of ACC's.

In accordance with this invention, the mobile station 10 may stay on the current ACC and listen for pages, even when performing the rescan. This can be implemented by using the time available after receiving one repeat of the ACC words. During the remaining repeats, the mobile station 10 can measure one or more rescan ACC's. This procedure could be referred to as reselection, since it resembles a simple reselection protocol. The rescan procedure thus attempts to implement the same function as the reselection function on the DCCH.

The teachings of this invention can also be applied to the residential phone system case. In a conventional residential system the residential base station, also referred to as a home base station, is an autonomous system that is not a part of the neighbor channel measurements, even on the Digital Control Channel. Because of this autonomous case, the mobile station 10 has the residential channel number prestored into a semipermanent portion of the memory 24. While residing on the ACC and using the teaching of this invention to periodically make a DCCH scan, the mobile station 10 may also measure the residential base station channel. In this manner the mobile station 10 can ensure that it can also use the residential system in the event the DCCH coverage area does not include the particular residential neighborhood where the residential base station is installed.

For a dual band case, it is within the scope of the teaching of this invention that the DCCH pointer on the ACC can also point to the other frequency band. In this case the RF section of the mobile station tunes to the different frequency band when monitoring the lower band ACC.

It should further be realized that certain steps shown in FIGS. 4 and 5 could be re-ordered, replaced by other steps, and/or new and additional steps inserted.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station in a cellular communication system, comprising the steps of:

while operating in an idle state for monitoring an analog control channel (ACC), tuning a receiver of the mobile station to an analog control channel (ACC) that is broadcast by a base station that services a current cell within which the mobile station is operating;

receiving at least one repeat of a control word from the ACC;

determining if the received repeat of the control word was received without error; and for the case where the control word was received without error, tuning the receiver to at least one other control channel and making a received signal strength measurement from the at least one other control channel.

2. A method as in claim 1, wherein the other control channel is an ACC of a neighboring cell.

3. A method as in claim 1, wherein the other control channel is a digital control channel (DCCH) of the mobile station's current cell.

4. A method as in claim 1, wherein the other control channel is a digital control channel (DCCH) of a neighboring cell.

5. A method for operating a mobile station in a cellular communication system, comprising the steps of:

tuning a receiver of the mobile station to an analog control channel (ACC) that is broadcast by a base station that services a current cell within which the mobile station is operating;

receiving at least one repeat of a control word from the ACC;

determining if the received repeat of the control word was received without error; and for the case where the control word was received without error, tuning the receiver to at least one other control channel and making a received signal strength measurement from the at least one other control channel, wherein the ACC is partitioned into frames, each frame comprising a plurality of repeats of the control word, and wherein the step of tuning includes a step of initiating a timer to have a value that is less than an amount of time remaining in the ACC frame from which the repeat of the control word was received without error.

6. A method as in claim 1, and further comprising the step of:

storing a result of the RSSI measurement in a memory of the mobile station.

7. A method as in claim 6, and further comprising the step of:

reporting to the base station an identity of at least those control channels having a strongest RSSI measurement.

8. A method as in claim 1, and further comprising the step of:

retuning the receiver of the mobile station to the ACC that is broadcast by the base station that services the current cell within which the mobile station is operating.

9. A method as in claim 5, wherein the step of tuning includes the steps of:

testing the timer to determine if the mobile station has sufficient time to tune to and measure the received signal strength of another control channel; and if not, retuning the receiver of the mobile station to the ACC that is broadcast by the base station that services the current cell within which the mobile station is operating.

10. A method for selecting a control channel in a cellular communication system, comprising steps of:

broadcasting messages from a base station to a mobile station via an analog control channel (ACC) that is partitioned into frames of predetermined duration, the base station formulating an individual one of the messages of the ACC to have a synchronization portion followed by a first appearance of a data carrying word which is followed, in turn, by a plurality of repeated appearances of the word;

while operating in an idle state for monitoring the ACC, tuning a receiver of the mobile station to the ACC;

determining if the first appearance of the word was received without error;

if so, during at least one repeated appearance of the word, tuning the receiver to at least one other control channel for measuring the signal strength of the at least one other control channel; and storing a result of the signal strength measurement in a memory of the mobile station.

11. A method as in claim 10, wherein the other control channel is an ACC of a neighboring cell.

12. A method as in claim 10, wherein the other control channel is a digital control channel (DCCH) of the mobile station's current cell.

13. A method as in claim 10, wherein the other control channel is a digital control channel (DCCH) of a neighboring cell.

14. A method for selecting a control channel in a cellular communication system, comprising steps of:

broadcasting messages from a base station to a mobile station via an analog control channel (ACC) that is partitioned into frames of predetermined duration, the base station formulating an individual one of the messages of the ACC to have a synchronization portion followed by a first appearance of a data carrying word which is followed, in turn, by a plurality of repeated appearances of the word;

tuning a receiver of the mobile station to the ACC;

determining if the first appearance of the word was received without error;

if so, during at least one repeated appearance of the word, tuning the receiver to at least one other control channel for measuring the signal strength of the at least one other control channel; and storing a result of the signal strength measurement in a memory of the mobile station, wherein the step of tuning the receiver to at least one other control channel includes a preliminary step of initiating a timer to have a value that is less than an amount of time remaining in a current ACC frame; and further including the steps of:
testing the timer to determine if the mobile station has sufficient time to tune to and measure the signal strength of another control channel; and
if not, retuning the receiver of the mobile station to the ACC to receive a next ACC frame.

15. A method as in claim 10, and further comprising the step of retuning the receiver of the mobile station to the ACC.

16. A method as in claim 10, and further comprising the step of reporting to the base station an identity of at least those other control channels having a strongest RSSI measurement.

17. A method as in claim 10, wherein the other control channel is a control channel of a residential base station.

18. A method as in claim 10, wherein the mobile station is a dual band mobile station, and wherein the other control channel is a control channel located in a frequency band that differs from the frequency band of the ACC.

19. A mobile station operable in a cellular communication system, comprising:

a controller coupled to a memory; and a tunable receiver operable, while operating in an idle state for monitoring an analog control channel (ACC), for being tuned to receive an analog control channel (ACC) that is broadcast by a base station that services a current cell within which the mobile station is operating; wherein said controller is responsive to a receipt of at least one repeat of a control word from the ACC for determining if the received repeat of the control word was received without error; and, for the case where the control word was received without error, for tuning the mobile station receiver to at least one other control channel and making a received signal strength measurement from the at least one other control channel.

20. A mobile station as in claim 19, wherein the other control channel is at least one of an ACC of a neighboring cell, a digital control channel (DCCH) of the mobile station's current cell, or a digital control channel (DCCH) of a neighboring cell.

21. A mobile station as in claim 19, wherein the other control channel is a control channel of a residential base station.

22. A mobile station operable in a cellular communication system, comprising:

a controller coupled to a memory; and a tunable receiver operable for being tuned to receive an analog control channel (ACC) that is broadcast by a base station that services a current cell within which the mobile station is operating; wherein said controller is responsive to a receipt of at least one repeat of a control word from the ACC for determining if the received repeat of the control word was received without error; and, for the case where the control word was received without error, for tuning the mobile station receiver to at least one other control channel and making a received signal strength measurement from the at least one other control channel, wherein the ACC is partitioned into frames, each frame comprising a plurality of repeats of the control word, and wherein the mobile station further comprises a timer that is coupled to said controller for being initialized to a value that is less than an amount of time remaining in the ACC frame from which the repeat of the control word was received without error, said controller further testing said timer to determine if the mobile station has sufficient time to tune to and measure the received signal strength of another control channel; and, if not, said controller operating to retune said receiver of the mobile station to the ACC that is broadcast by the base station that services the current cell within which the mobile station is operating.

23. A mobile station as in claim 19, wherein said tunable receiver can be tuned to receive signals from one of a least two different and non-overlapping frequency bands.

24. A mobile station as in claim 19, wherein said mobile station is a dual band mobile station, and wherein the other control channel is a control channel located in a frequency band that differs from the frequency band of the ACC.

* * * * *